(12) United States Patent
Pelliconi

(10) Patent No.: US 6,819,162 B2
(45) Date of Patent: Nov. 16, 2004

(54) CHARGE PUMP FOR NEGATIVE VOLTAGES

(75) Inventor: Roberto Pelliconi, Imola (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/374,762

(22) Filed: Feb. 24, 2003

(65) Prior Publication Data

US 2003/0214346 A1 Nov. 20, 2003

(30) Foreign Application Priority Data

Feb. 25, 2002 (IT) .................................... TO2002A0158

(51) Int. Cl.[7] .............................................. G05F 3/02
(52) U.S. Cl. ...................................... 327/536; 363/59
(58) Field of Search ................................ 327/536, 537; 363/59

(56) References Cited

U.S. PATENT DOCUMENTS

| | | | | |
|---|---|---|---|---|
| 6,107,864 A | * | 8/2000 | Fukushima et al. ......... | 327/536 |
| 6,278,315 B1 | * | 8/2001 | Kim ............................ | 327/536 |
| 6,359,501 B2 | * | 3/2002 | Lin et al. .................... | 327/536 |
| 6,429,723 B1 | * | 8/2002 | Hastings ..................... | 327/536 |
| 6,476,666 B1 | * | 11/2002 | Palusa et al. ............... | 327/536 |
| 6,498,527 B2 | * | 12/2002 | Matsumoto ................. | 327/536 |
| 2003/0071301 A1 | * | 4/2003 | Wald et al. ................. | 257/314 |

* cited by examiner

*Primary Examiner*—Terry D. Cunningham
(74) *Attorney, Agent, or Firm*—Lisa K. Jorgenson; Robert Iannucci; Seed IP Law Group PLLC

(57) ABSTRACT

A charge pump for negative voltages, having at least one stage including a high-voltage terminal and a low-voltage terminal; a first branch and a second branch, which are symmetrical and are connected between the high-voltage terminal and the low-voltage terminal and each of which comprises a respective first transistor and a respective second transistor. The first and the second transistors are all triple-well MOS transistors of one and the same polarity type.

19 Claims, 3 Drawing Sheets

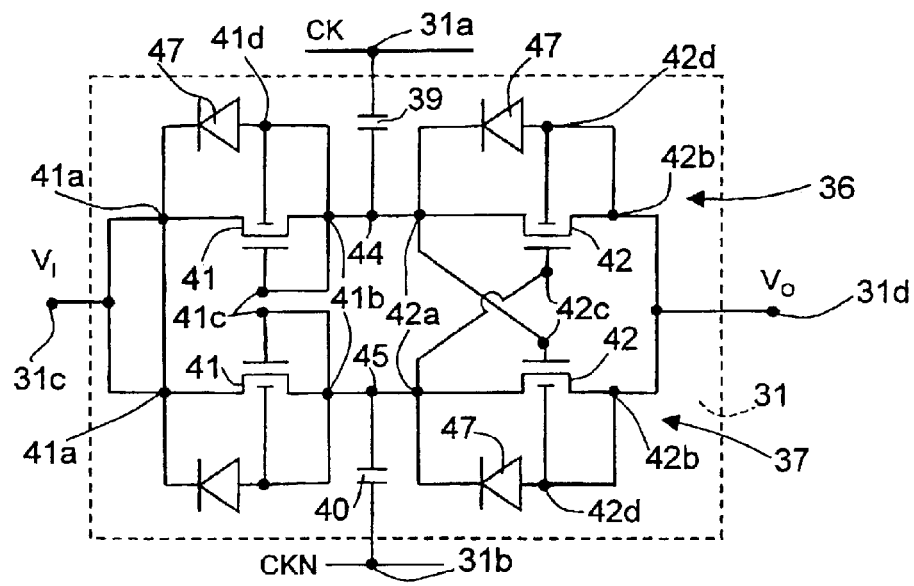
*FIG. 4*
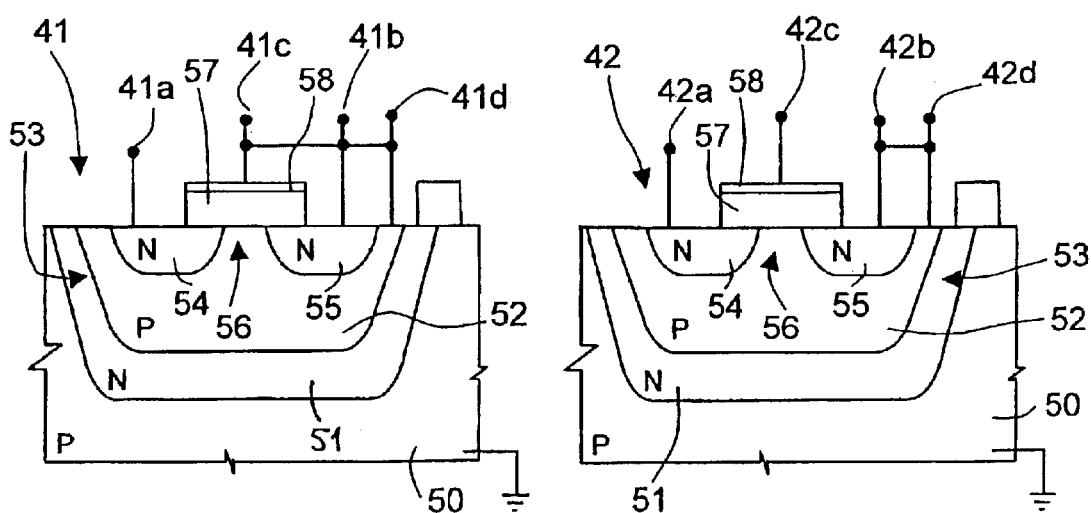
*FIG. 5A*  *FIG. 5B*

CHARGE PUMP FOR NEGATIVE VOLTAGES

BACKGROUND OF THE INVENTION

1. Field of the Invention

The present invention relates to a charge pump for negative voltages.

2. Description of the Related Art

As is known, in many fields of microelectronics, the need to reduce consumption and overall dimensions leads to the use of ever lower supply voltages.

In various cases, however, the dynamics that can be obtained from supply voltages is insufficient to guarantee proper operation of all the parts that make up a given circuit or device. For example, many devices comprising nonvolatile memories, such as memories of EEPROM or flash types, are supplied with voltages of between 0 V and 1.8 V; on the other hand, the circuits for reading and writing said memories normally require higher voltages, of approximately 5–15 V, and hence could not operate with such limited dynamics. In other cases, negative voltages are required, or in any case voltages lower than the minimum supply voltage.

The problem is normally solved by using charge-pump circuits, positive and/or negative ones, which are able to supply voltages having values higher or lower than the maximum dynamics allowed by the supply voltages.

An example of charge pump is described in the U.S. Pat. No. 5,874,850, granted on Feb. 23, 1999 to STMicroelectronics S.r.l., which is incorporated by reference in its entirety.

The contents of said patent will be illustrated briefly hereinafter, with reference to FIGS. 1 and 2, in which a charge-pump voltage-boosting circuit is designated as a whole by 1. The voltage-boosting circuit 1 comprises a voltage-boosting stage 2, having a low-voltage input terminal 2a, a high-voltage output terminal 2b, and a first driving terminal 2c and a second driving terminal 2d; and an oscillator 3, connected to a supply line 5 and having outputs connected to the first driving terminal 2c and the second driving terminal 2d, respectively, and supplying a first timing signal CK1 and a second timing signal CK2, respectively, which are in phase opposition with respect to one another.

The voltage-boosting stage 2 has a first branch 6 and a second branch 7, each of which comprises an NMOS transistor 9 and a PMOS transistor 10, and a first capacitor 11 and a second capacitor 12. In each of the two branches 6, 7, the NMOS transistors 9 and the PMOS transistors 10 have their source terminals 9a and 10a, connected to a respective node 13, 14 and their drain terminals 9b, 10b, connected, respectively, to the input terminal 2a and to the output terminal 2b of the voltage-boosting stage 2. Furthermore, the NMOS transistors 9 and PMOS 10 of the first branch 6 have gate terminals connected to the node 14 of the second branch 7 and, vice versa, the NMOS transistors 9 and PMOS transistors 10 of the second branch 7 have their gate terminals connected to the node 13 of the first branch 6. The NMOS transistors 9 have well terminals 9c connected directly to the respective drain terminals 9b and, via incorporated diodes 15 (well diodes or bulk diodes), to the respective source terminals 9a. In a dual way, the PMOS transistors 10 have well terminals 10c connected directly to the respective source terminals 10a and, via incorporated diodes 16, to the respective drain terminals 10b. In each of the branches 6, 7, in practice, the incorporated diodes 15, 16 are connected in series and, when they are biased directly, form conductive paths that facilitate passage of current between the input terminal 2a and the output terminal 2b of the voltage-boosting stage 2.

The first capacitor 11 is connected between the first driving terminal 2c and the node 13 of the first branch 6, and the second capacitor 12 is connected between the second driving terminal 2d and the node 14 of the second branch 7.

The charge pump 1 is efficient and has small overall dimensions, but is not suitable for being used as a negative charge pump, since in this case it would present biasing problems.

For greater clarity, reference is made to FIG. 2, in which one of the PMOS transistors 10 is shown. The PMOS transistors 10 are made in a substrate 18, here of type P, and each comprise a well 20, of type N, in which conductive source regions 21 and conductive drain regions 22 are embedded, both of type P. By means of the drain terminal 10b and the well terminal 10c, the conductive drain region 22 and the well 20 are connected together directly and hence are always at the same voltage. In FIG. 2, the incorporated diodes 16 are shown with dashed line.

In particular, in known charge pumps the biasing of the junction between the internal wells 20 of the PMOS transistors 10 and the substrate 18 is problematical. This junction, in fact, must always remain reverse-biased during operation of the device to prevent one of the parasitic currents being injected from the substrate 18 into the internal wells 20. For this reason, it is obviously necessary for all the internal wells 20 (of type N) to be set at a voltage higher than the voltage of the substrate 18 (of type P). In particular, given that the substrate 18 must be connected to ground, the internal wells 20 of the PMOS transistors 10 must always be at a positive voltage. On the other hand, in a multi-stage negative charge pump, the input terminals 2a and output terminals 2b of the stages downstream of the first would be at a negative voltage. The output terminal 2b is, however, directly connected to the drain terminals 10b of the PMOS transistors 10 and hence also to the wells 20, which would thus be biased at a negative voltage, lower than the voltage of the substrate 18. Consequently, the junctions between the substrate 18 and the internal wells 20 of the PMOS transistors 10 would be biased directly, so causing malfunctioning.

BRIEF SUMMARY OF THE INVENTION

An embodiment of the present invention provides a negative charge pump that is free from the drawbacks described above.

The charge pump includes a voltage-boosting stage having symmetrical first and second branches connected between a high-voltage terminal and a low-voltage terminal. Each of the branches includes a respective first transistor and a respective second transistor; wherein said first and second transistors are all triple-well MOS transistors of one and the same polarity type

BRIEF DESCRIPTION OF THE SEVERAL VIEWS OF THE DRAWING(S)

For a better understanding of the invention, an embodiment thereof is now described purely by way of non-limiting example and with reference to the attached drawings, in which:

FIG. 4 is an electrical diagram of a part of the charge pump of FIG. 4; and

FIGS. 5A and 5B are cross sections of electrical components belonging to the charge pump of FIG. 4.

DETAILED DESCRIPTION OF THE INVENTION

Figure 1:
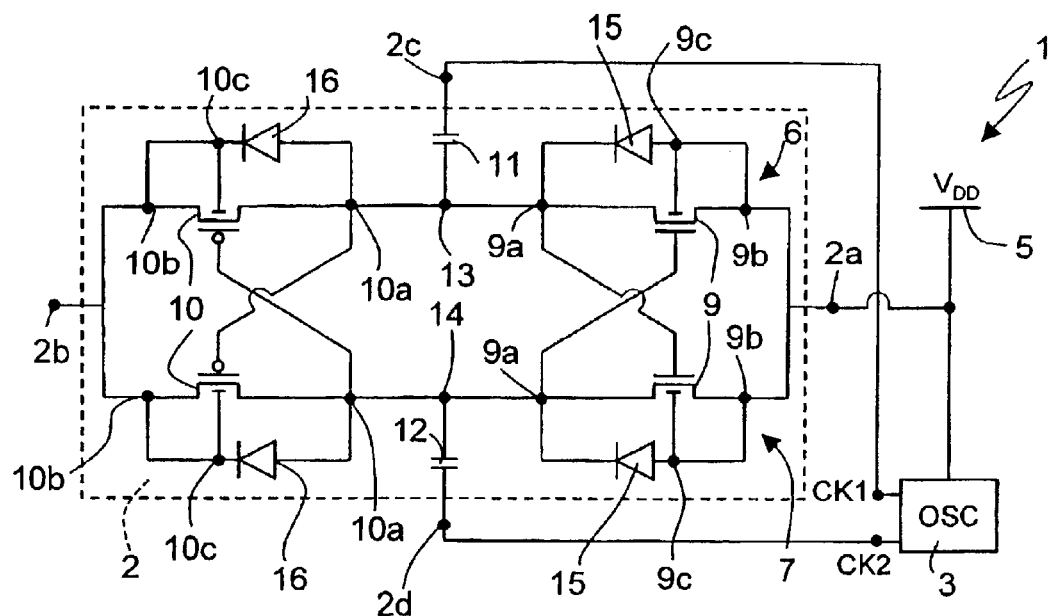
FIG. 1 is an electrical diagram of a positive charge pump of a known type.
Figure 2:
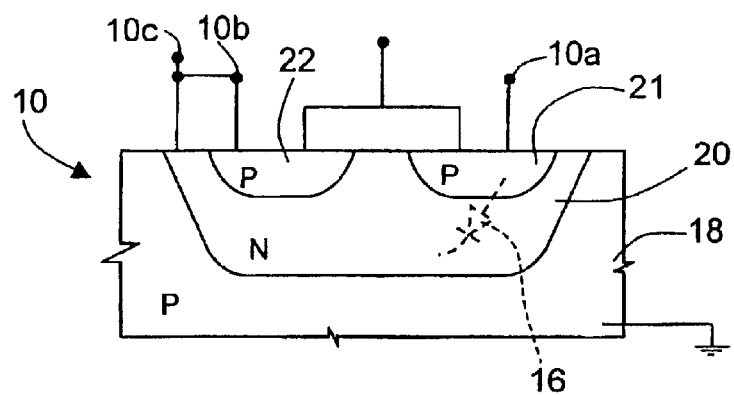
FIG. 2 is a cross section of an electrical component built into the charge pump of FIG. 1.
Figure 3:
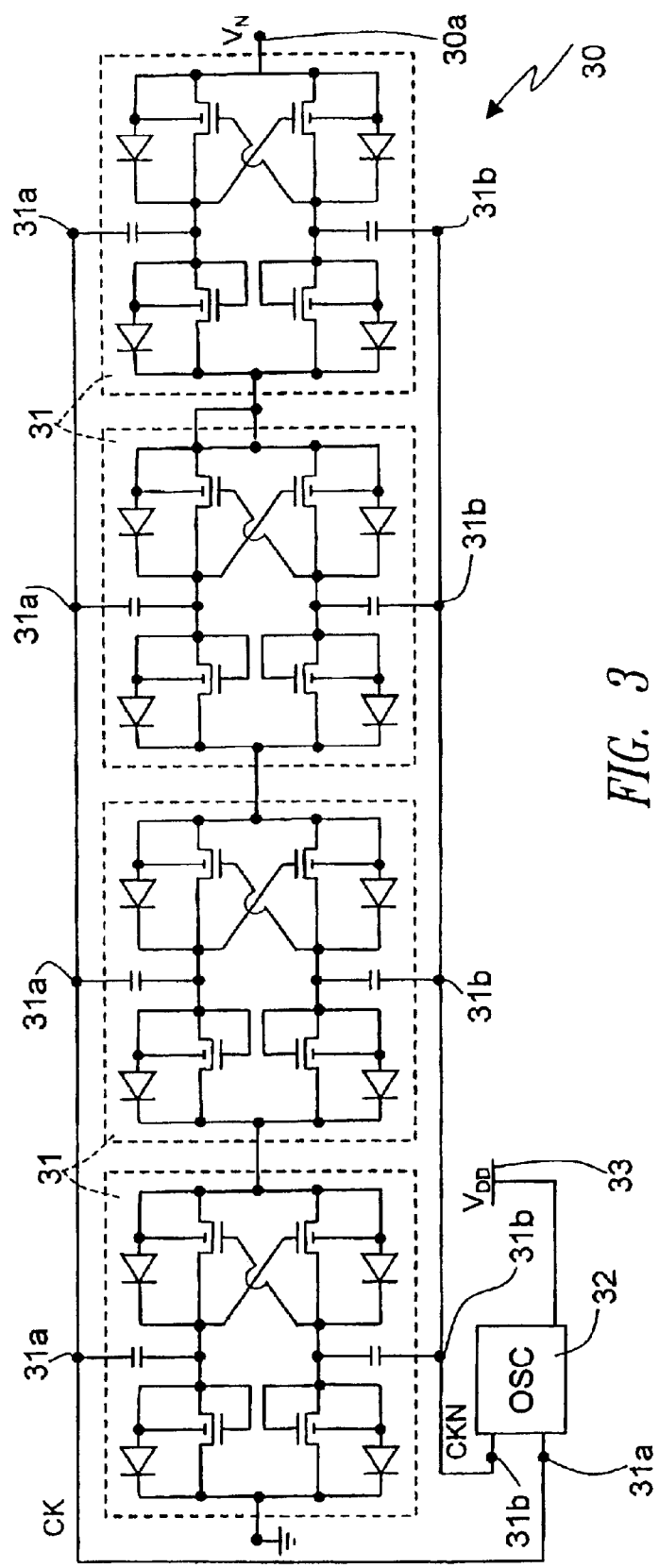
FIG. 3 is a simplified electrical diagram of a charge pump according to an embodiment of the present invention.

With reference to FIG. 3, a negative charge pump is designated as a whole by 30 and comprises a plurality of stages 31 (in this case four) cascaded together, and an oscillator 32 connected to a supply line 33, which supplies a supply voltage VDD of, for example, 1.8 V.

An input terminal of the stage 31 placed further upstream is connected to ground, and an output terminal of the stage 31 placed further downstream forms an output 30a of the charge pump 30 and supplies a negative boosted voltage VN.

The oscillator 32 has a first output 32a and a second output 32b, which supply a timing signal CK and a negated timing signal CKN, respectively, which oscillate between 0 V and the supply voltage VDD with a pre-set frequency and in phase opposition. The first output 32a and the second output 32b of the oscillator 32 are connected, respectively, to first driving terminals 31a and second driving terminals 31b for driving the stages 31.

As is shown in FIG. 4, each of the stages 31 further has an input terminal 31c and an output terminal 31d, on which are present an input voltage VI and, respectively, an output voltage VO, which is lower than the input voltage VI, and comprises a first branch 36 and a second branch 37, which are mutually symmetrical, as well as a first capacitor 39 and a second capacitor 40.

The first capacitor 39 has a first terminal connected to the first driving terminal 31a and a second terminal connected to a first transfer node 44 of the first branch 36; and the second capacitor 40 has a first terminal connected to the second driving terminal 31b and a second terminal connected to a second transfer node 45 of the second branch 37.

The first branch 36 and the second branch 37 are mutually symmetrical and are connected between the input terminal 31c and the output terminal 31d. In detail, each of the branches 36, 37 comprises a respective diode transistor 41 and a respective switching transistor 42, all of the NMOS type. The diode transistor 41 of the first branch 36 has a source terminal 41a connected to an input terminal 31c of the stage 31 and drain terminals 41b and gate terminals 41c both connected to the first transfer node 44. The switching transistor 42 of the first branch 36 has a source terminal 42a connected to the first transfer node 44, a drain terminal 42b connected to the output terminal 31b, and a gate terminal 42c connected to the second transfer node 45. Likewise, the diode transistor 41 of the second branch 37 has the source terminal 41a connected to the input terminal 31c, and the drain terminal 41b and the gate terminal 41c both connected to the second transfer node 45; and the switching transistor 42 of the second branch 37 has the source terminal 42a connected to the second transfer node 45, the drain terminal 42b connected to an output terminal 31d, and the gate terminal 42c connected to the first transfer node 44. Furthermore, all the transistors 41, 42 have well terminals 41d, 42d directly connected to the respective drain terminals and have respective incorporated diodes 47 (well diodes) between the well terminals 41d, 42d and the source terminals, as explained in detail hereinafter.

The operation of the charge pump 30 will be illustrated hereinafter, with initial reference to a single stage 31 and, in particular, to the first branch 36 (FIG. 4).

Suppose that, in a first step, the timing signal CK supplied by the oscillator 31 is high (i.e., substantially equal to the supply voltage VDD) and, consequently, the negated timing signal CKN is low (approximately 0 V). In the first branch 36, the switching transistor 42 is inhibited, while the diode transistor 41 and the respective incorporated diode 47 conduct until the voltage on the first transfer node 44, which is initially higher, substantially goes to the value of the input voltage VI (in actual fact, the voltage on the first transfer node 44 remains slightly higher on account of the turning-on thresholds of the diode transistor 41 and of the incorporated diode 47). Consequently, between the terminals of the first capacitor 39 (i.e., between the first driving terminal 31a and the first transfer node 44) a voltage is present.

Next, the timing signal CK and the negated timing signal CKN switch, going to 0 V and to the supply voltage VDD, respectively. Upon switching, the first transfer node 44 is forced to a negative-voltage value, given that the first capacitor 39 had previously been charged and is unable to absorb current from the input terminal 31c through the diode transistor 41. In particular, in this step the voltage on the first transfer node 44 is lower than the output voltage VO. Simultaneously, the switching transistor 42 of the first branch 37, which has its gate terminal connected to the second transfer node 45, is turned on and hence the first capacitor 39 can absorb charge from the output terminal 31d. Consequently, the voltage on the first transfer node 44 increases, whilst the output voltage VO decreases, becoming lower than the input voltage VI and, in particular, negative. Furthermore, also the voltage between the terminals of the first capacitor 39 decreases. Consequently, when the timing signal CK switches again to the high value, the first transfer node 44 is brought back to a voltage higher than the input voltage VI and transfers to the input terminal 31c the charge received from the output terminal 31d.

The second branch 37, which is symmetrical and is driven in phase opposition with respect to the first branch 36, operates in an altogether similar way. In practice, each of the two branches 36, 37 carries out a transfer of charge in two steps from the output terminal 31d to the input terminal 31c, using the first capacitor 39 and the second capacitor 40, respectively. Consequently, the output terminal 31c is forced to a voltage lower than the voltage of the input terminal 31c.

Clearly, in the four-stage charge pump 30 the value of the boosted negative voltage VN is due to the sum of the contributions of the individual stages 31 (FIG. 3).

With reference to FIGS. 5A and 5B, all the diode transistors 41 and the switching transistors 42 of the charge pump 30 are of the same type, in particular, triple-well NMOS transistors, and are made inside one and the same substrate 50, having conductivity of type P. In detail, the diode transistors 41 and the switching transistors 42 each comprise an insulation well 51, having conductivity of type N, opposite to the conductivity of the substrate 50, and an internal well 52, embedded in the external well 51 and having the same conductivity as the substrate 50 (type P). In practice, between each external well 51 and the respective internal well 52 an insulation junction 53 is formed. In turn, the internal well 52 houses a conductive source region 54 and a conductive drain region 55, separated from one another by a channel region 56 and having both conductivity of type N (i.e., opposite to the conductivity of the substrate 50). The channel region 56 is then overlaid by a gate-oxide region 57, on which a conductive gate region 58 and the respective gate terminal 41c, 42c are formed. In all of the transistors 41, 42, the external well 51 is directly connected to the substrate 50, while the internal well 52 is directly connected to the respective conductive drain region 55. Furthermore, in the diode transistors 41 the conductive drain regions 55 and gate regions 58 are directly connected together by the respective drain terminals 41b and gate terminals 41c. FIGS. 5A, 5B show with a dashed line also the incorporated diodes 47 present between the conductive source regions 54 of the transistors 41, 42 and the respective internal wells 52.

In this way, advantageously, both in the diode transistors 41 and in the switching transistors 42, the internal wells 52 (of type P) are always at a voltage lower than the respective external wells 51 (of type N). Consequently, the insulation junctions 53 are always reverse-biased and any malfunctioning is prevented. In fact, while the internal wells 52 are biased at negative voltages, the external wells 51 are connected directly to the substrate 50, which is at ground, and hence they are at zero voltage.

Only in the diode transistors 41 of the stage 31, placed further upstream, the insulation junctions 53 are biased directly. The input terminal 31c of said stage, in fact, is connected to ground (FIG. 3) and hence can absorb current from the respective capacitors 39, 40 only if the transfer nodes 44, 45 are at a positive voltage. The transfer nodes 44, 45, on the other hand, are directly connected to the internal wells 52 of the respective diode transistors 41 by means of the well terminals 41d (see FIGS. 5A, 5B), and hence the internal wells 51 are at higher voltages than the external wells 52. In this case, however, direct biasing of the insulation junctions 53 is advantageous. In fact, the charge transferred by the stage 31 placed further upstream must be absorbed by the ground. Since the insulation junctions 53 form conductive paths in parallel with the respective diode transistors 41 and incorporated diodes 47, proper operation of the stage is favored.

The invention has further advantages. In particular, during operation, the maximum voltage to which the gate-oxide layer 57 of the transistors 41, 42 is subjected, i.e., the maximum voltage that can be set up between the gate terminals of the transistors 41, 42 themselves and the respective internal wells 52, never exceeds the value of the supply voltage VDD, and hence transistors of the low-voltage type can advantageously be used. Such transistors are in fact optimized so as to afford very high performance in terms of switching speed, internal resistance and driving voltage, and moreover have small overall dimensions, but can not bear higher voltages than the supply voltage.

In addition, as regards the driving of the stages 31, the negated timing signal CKN can be obtained from the timing signal CK simply by using a NOT gate and it is not necessary to envisage intervals of separation of the steps (disoverlapping).

Finally it is evident that modifications and variations can be made to the device, without departing from the scope of the present invention. In particular, the charge pump could be built in a dual way with respect to what is described, using triple-well transistors of the PMOS type made in an N-type substrate. All of the above U.S. patents, U.S. patent application publications, U.S. patent applications, foreign patents, foreign patent applications and non-patent publications referred to in this specification and/or listed in the Application Data Sheetare incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A charge pump for negative voltages, comprising:
a voltage-boosting stage that includes:
a high-voltage terminal and a low-voltage terminal;
a first branch and a second branch, which are symmetrical and are connected between said high-voltage terminal and said low-voltage terminal and each of which includes a respective first transistor and a respective second transistor; wherein said first and second transistors are all triple-well MOS transistors of one and the same polarity type, wherein said first transistors of said first branch and said second branch have first conduction terminals connected to said high-voltage terminal and second conduction terminals connected, respectively, to a first charge-transfer node and a second charge-transfer node, wherein said first transistors of said first branch and said second branch have control terminals connected to said respective second conduction terminals of said first transistor.

2. The charge pump according to claim 1, wherein said first transistors and said second transistors are made in a substrate having a first type of conductivity, and each transistor comprises a respective first well, having a second type of conductivity, opposite to the first type, a respective second well, embedded in said first well and having said first type of conductivity, and respective first conduction regions and second conduction regions, housed in said second well and having said second type of conductivity.

3. The charge pump according to claim 2, wherein said first and second transistors incorporate respective diodes connected between said respective first conduction regions and said respective second conduction regions.

4. The charge pump according to claim 3, wherein said respective second conduction regions of said first and second transistors are directly connected to the respective second wells.

5. The charge pump according to claim 2, wherein said first wells are directly connected to said substrate.

6. The charge pump according to claim 1 wherein said first and second transistors are of the NMOS type.

7. The charge pump according to claim 1 wherein the voltage-boosting stage includes a first driving terminal of said first branch and a second driving terminal of said second branch, driven in phase opposition.

8. The charge pump according to claim 7, wherein the voltage-boosting stage includes a first capacitor, connected between said first driving terminal and said first charge-transfer node, and a second capacitor connected between said second driving terminal and said second charge-transfer node.

9. The charge pump according to claim 8, further comprising an oscillator having outputs connected to said first driving terminal and to said second driving terminal, respectively, and supplying a first timing signal and a second timing signal in phase opposition with respect to one other.

10. The charge pump according to claim 1 wherein the voltage-boosting stage is a first of a plurality of voltage-boosting stages cascaded together, the high-voltage terminal of the first voltage-boosting stage being connected to a reference-potential line.

11. A charge pump for negative voltages, comprising:
first and second voltage terminals;
first and second control input terminals;
a first branch including a first transistor connected between the first voltage terminal and the first control input terminal and a second transistor connected between the first control input terminal and the second voltage terminal, the first transistor having a control terminal connected to, and driven by, the first control input terminal, and the second transistor having a control terminal connected to, and driven by, the second control input terminal; and
a second branch including a third transistor connected between the first voltage terminal and the second control input terminal and a fourth transistor connected between the second control input terminal and the second voltage terminal, the third transistor having a control terminal connected to, and driven by, the second control input terminal, and the second transistor having a control terminal connected to, and driven by, the first control input terminal.

12. The charge pump of claim 11, wherein the transistors are made in a substrate having a first type of conductivity, and each transistor comprises a respective first well, having a second type of conductivity, opposite to the first type, a respective second well, embedded in the first well and having the first type of conductivity, and respective first conduction regions and second conduction regions, housed in the second well and having the second type of conductivity.

13. The charge pump of claim 12, wherein the respective second conduction regions of the transistors are directly connected to the respective second wells.

14. The charge pump of claim 11, further comprising first, second, third, and fourth diodes connected in parallel with the first, second, third, and fourth transistors, respectively.

15. The charge pump of claim 11 the transistors are all NMOS transistors.

16. The charge pump of claim 11, further comprising:
a first capacitor connected between the first control input terminal and a first charge-transfer node at which the first and second transistors are connected; and
a second capacitor connected between the second control input terminal and a second charge-transfer node at which the third and fourth transistors are connected.

17. The charge pump of claim 16, further comprising an oscillator having first and second outputs connected to the first control input terminal and to the second control input terminal, respectively, and supplying a first timing signal and a second timing signal in phase opposition with respect to one other.

18. A charge pump for negative voltages, comprising:
first and second voltage terminals;
a first branch including first and second transistors connected between the first and second voltage terminals, the first transistor being diode-connected and having a first conduction terminal connected to the first voltage terminal, a second conduction terminal connected to the second transistor, and a control terminal connected to the second conduction terminal, and the second transistor including a control terminal; and
a second branch connected in parallel with the first branch between the first and second voltage terminals and including third and fourth transistors, the third transistor being diode-connected and having first and second conduction terminals and a control terminal, the second conduction terminal and control terminal of the third transistor each being connected to the fourth transistor and to the control terminal of the second transistor, and the fourth transistor having a control terminal connected to the control and second conduction terminals of the first transistor.

19. The charge pump of claim 18, further comprising:
a first capacitor connected between the first control input terminal and a first charge-transfer node at which the first and second transistors are connected; and
a second capacitor connected between the second control input terminal and a second charge-transfer node at which the third and fourth transistors are connected.

* * * * *